(12) United States Patent
Ichimiya

(10) Patent No.: US 9,380,247 B2
(45) Date of Patent: Jun. 28, 2016

(54) FOCUS DETECTION APPARATUS, METHOD FOR CONTROLLING THE SAME AND IMAGE CAPTURING APPARATUS

(71) Applicant: CANON KABUSHIKI KAISHA, Tokyo (JP)

(72) Inventor: Takashi Ichimiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/665,409

(22) Filed: Mar. 23, 2015

(65) Prior Publication Data

US 2015/0281617 A1    Oct. 1, 2015

(30) Foreign Application Priority Data

Mar. 27, 2014   (JP) .................................. 2014-066806

(51) Int. Cl.
   *H04N 5/378* (2011.01)
   *H04N 5/232* (2006.01)
   *H04N 5/376* (2011.01)

(52) U.S. Cl.
   CPC ........... *H04N 5/378* (2013.01); *H04N 5/23212* (2013.01); *H04N 5/23229* (2013.01); *H04N 5/3765* (2013.01)

(58) Field of Classification Search
   CPC .......... H04N 5/23212; H04N 5/23229; H04N 5/3765; H04N 5/378
   See application file for complete search history.

(56) References Cited

U.S. PATENT DOCUMENTS

| | | | | |
|---|---|---|---|---|
| 7,102,681 B1* | 9/2006 | Kashiyama | ............... | G02B 7/36 348/297 |
| 7,283,163 B1* | 10/2007 | Noda | ........................ | G02B 7/34 348/243 |
| 9,160,919 B2* | 10/2015 | Ito | ...................... | H04N 5/23212 |
| 2006/0078217 A1* | 4/2006 | Poon | ................... | H04N 5/23212 382/255 |
| 2008/0074534 A1* | 3/2008 | Kusaka | ............... | H04N 5/23212 348/364 |
| 2008/0240699 A1* | 10/2008 | Ichimiya | ................... | G02B 7/34 396/96 |
| 2009/0219423 A1* | 9/2009 | Suzuki | ............... | H04N 5/23212 348/302 |
| 2011/0019015 A1* | 1/2011 | Takanashi | ............... | G02B 7/282 348/208.6 |
| 2014/0211058 A1* | 7/2014 | Nishihara | ............... | H04N 5/378 348/308 |
| 2014/0253787 A1* | 9/2014 | Shu | ..................... | H04N 5/23212 348/353 |
| 2014/0253792 A1* | 9/2014 | Watanabe | ............ | H04N 5/2353 348/362 |

FOREIGN PATENT DOCUMENTS

| | | |
|---|---|---|
| JP | 10-333021 A | 12/1998 |
| JP | 2006-251777 A | 9/2006 |

* cited by examiner

*Primary Examiner* — Amy Hsu
(74) *Attorney, Agent, or Firm* — Cowan, Liebowitz & Latman, P.C.

(57) ABSTRACT

A focus detection apparatus comprises a plurality of sensor groups, each comprising a plurality of sensors, each including a photoelectric converter and a storage portion, and controls part of the sensor groups according to a first accumulation method, in which charge generated by a photoelectric converter is accumulated in itself, and to a second accumulation method, in which charge generated by a photoelectric converter is accumulated in a storage portion. A sensor group corresponding to a selected focus detection area is controlled according to the first accumulation method, and a sensor group adjacent to the sensor group controlled according to the first accumulation method is controlled according to the second accumulation method. A monitor unit monitors a signal level of the charge stored in the storage portion corresponding to the photoelectric converter controlled according to the second accumulation method.

13 Claims, 13 Drawing Sheets

FIG. 8

| MAIN SUBJECT POSITION | \multicolumn{18}{c}{LINE SENSOR PAIR 101-} |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 |
| FOCUS DETECTION AREA 301 | ○ | ○ | ◁ | — | — | — | — | — | — | — | — | — | — | — | — | — | — | — |
| FOCUS DETECTION AREA 302 | — | ◀ | ● | ○ | ◁ | — | — | — | — | — | — | — | — | — | — | — | — | — |
| FOCUS DETECTION AREA 303 | — | — | — | ◀ | ● | ○ | ◁ | — | — | — | — | — | — | — | — | — | — | — |
| FOCUS DETECTION AREA 304 | — | — | — | — | — | ◀ | ● | ○ | ◁ | — | — | — | — | — | — | — | — | — |
| FOCUS DETECTION AREA 305 | — | — | — | — | — | — | — | ◀ | ● | ○ | ◁ | — | — | — | — | — | — | — |
| FOCUS DETECTION AREA 306 | — | — | — | — | — | — | — | — | — | ◀ | ● | ○ | ◁ | — | — | — | — | — |
| FOCUS DETECTION AREA 307 | — | — | — | — | — | — | — | — | — | — | — | ◀ | ● | ○ | ◁ | — | — | — |
| FOCUS DETECTION AREA 308 | — | — | — | — | — | — | — | — | — | — | — | — | — | ◀ | ● | ○ | ◁ | — |
| FOCUS DETECTION AREA 309 | — | — | — | — | — | — | — | — | — | — | — | — | — | — | — | ◀ | ● | ● |

FIG. 12

LINE SENSOR PAIR 101-

| MAIN SUBJECT POSITION | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| FOCUS DETECTION AREA 301 | ○ | ○ | ◁ | ○ | — | — | — | — | — | — | — | — | — | — | — | — | — | — |
| FOCUS DETECTION AREA 302 | ● | ◀ | ● | ○ | ◁ | ○ | — | — | — | — | — | — | — | — | — | — | — | — |
| FOCUS DETECTION AREA 303 | — | — | ● | ◀ | ● | ○ | ◁ | ○ | — | — | — | — | — | — | — | — | — | — |
| FOCUS DETECTION AREA 304 | — | — | — | — | ● | ◀ | ● | ○ | ◁ | ○ | — | — | — | — | — | — | — | — |
| FOCUS DETECTION AREA 305 | — | — | — | — | — | — | ● | ◀ | ● | ○ | ◁ | ○ | — | — | — | — | — | — |
| FOCUS DETECTION AREA 306 | — | — | — | — | — | — | — | — | ● | ◀ | ● | ○ | ◁ | ○ | — | — | — | — |
| FOCUS DETECTION AREA 307 | — | — | — | — | — | — | — | — | — | — | ● | ◀ | ● | ○ | ◁ | ○ | — | — |
| FOCUS DETECTION AREA 308 | — | — | — | — | — | — | — | — | — | — | — | — | ● | ◀ | ● | ○ | ◁ | ○ |
| FOCUS DETECTION AREA 309 | — | — | — | — | — | — | — | — | — | — | — | — | — | — | ● | ◀ | ● | ● |

# FOCUS DETECTION APPARATUS, METHOD FOR CONTROLLING THE SAME AND IMAGE CAPTURING APPARATUS

BACKGROUND OF THE INVENTION

1. Field of the Invention

The present invention relates to a focus detection apparatus used for automatic focus detection, a method for controlling the same, and an image capturing apparatus that uses the focus detection apparatus.

2. Description of the Related Art

Conventionally, there are known to be image capturing apparatuses and the like that have an auto-focus (AF) function according to which a subject is automatically focused on by the position of an imaging lens being adjusted according to a detected focus state of the subject, which is detected with a focus state detection sensor having photoelectric converter elements. Furthermore, it is known that the charge accumulation period and output gain of a photoelectric converter included in the focus state detection sensor is controlled according to the brightness and contrast of the subject.

For example, Japanese Patent Laid-Open No. 2006-251777 discloses a focus state detection sensor that uses a line sensor composed of multiple photoelectric converters (pixels), in which the line sensor is divided into multiple areas and accumulation is stopped at a time when the difference between the maximum value and the minimum value of the pixel signal for each area (contrast) exceeds a target value.

Also, Japanese Patent Laid-Open No. 10-333021 discloses that a monitor sensor is arranged near a line sensor pair used for focus detection, and the accumulation (integration) period for the line sensor pair is controlled according to a signal from the monitor sensor.

However, with the configuration disclosed in Japanese Patent Laid-Open No. 2006-251777, since the charge resulting from the photoelectric conversion performed by the pixels is always transferred to an accumulation circuit, noise occurring in the accumulation circuit during accumulation is also accumulated similarly to the charge resulting from the photoelectric conversion. If the accumulation period is long, the amount of noise that occurs will also increase, and therefore there has been a risk that noise components will significantly influence the charge result, which will cause an error to occur in the focus detection result.

On the other hand, in Japanese Patent Laid-Open No. 10-333021, since accumulation control is performed based on the output of the monitor sensor provided separately from the line sensor pair, the charge resulting from photoelectric conversion performed by the pixels during accumulation does not need to be transferred to an accumulation circuit or a monitor circuit. Accordingly, it is possible to reduce the noise that occurs by resetting the accumulation circuit and the monitor circuit until the accumulation in the pixels ends.

However, in Japanese Patent Laid-Open No. 10-333021, the monitor sensor needs to be arranged near the line sensors and high-accuracy photometry needs to be performed using the monitor sensor, or suitable accumulation control is not possible. Also, if multiple line sensors are to be arranged, the monitor sensor limits the layout of the line sensors, and in order to perform high-accuracy photometry, the arrangement of the monitor sensor itself is also limited. Consequently, the chip area for the focus state detection sensor increases, which causes an increase in cost and prevents a reduction of the size of the optical apparatus that uses the focus state detection sensor.

SUMMARY OF THE INVENTION

The present invention has been made in consideration of the above situation, and uses a simple configuration to obtain a charge accumulation result with good accuracy for use in focus detection.

According to the present invention, provided is a focus detection apparatus comprising: a plurality of sensor groups, each comprising a plurality of sensors, wherein each sensor includes a photoelectric converter configured to generate charge according to incident light and a storage portion configured to store charge transferred from the photoelectric converter, and each sensor group corresponds to each of a plurality of focus detection areas; a selection unit configured to select one of the plurality of focus detection areas; a control unit configured to control charge accumulation of the sensor group according to one of a first accumulation method in which charge generated by the photoelectric converter is accumulated in the photoelectric converter, and a second accumulation method in which charge generated by the photoelectric converter is transferred to and accumulated in the storage portion; and a monitor unit configured to, for each sensor group controlled according to the second accumulation method, monitor a signal level of the charge stored in the storage portion, wherein the control unit controls according to the first accumulation method a sensor group corresponding to the focus detection area selected by the selection unit, and controls according to the second accumulation method a sensor group adjacent to the sensor group controlled according to the first accumulation method.

Further, according to the present invention, provided is an image capturing apparatus comprising: an image capturing unit; and the focus detection apparatus defined as above.

Furthermore, according to the present invention, provided is a method for controlling a focus detection apparatus having a plurality of sensor groups, each comprising a plurality of sensors, wherein each sensor includes a photoelectric converter configured to generate charge according to incident light and a storage portion configured to store charge transferred from the photoelectric converter, and each sensor group corresponding to each of a plurality of focus detection areas, the method comprising: a selection step of selecting one of the plurality of focus detection areas; a control step of controlling, according to a first accumulation method in which charge generated by the photoelectric converter is accumulated in the photoelectric converter, a sensor group corresponding to the focus detection area selected in the selection step, and controlling, according to a second accumulation method in which charge generated by the photoelectric converter is transferred to and accumulated in the storage portion, a sensor group adjacent to the sensor group controlled according to the first accumulation method; and a monitor step of, for each sensor group controlled according to the second accumulation method, monitoring a signal level of the charge stored in the storage portion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a diagram showing a correspondence table of focus detection areas and accumulation types of line sensor pairs according to the first embodiment;

FIG. 12 is a diagram showing a correspondence table of focus detection areas and accumulation types of line sensor pairs according to the second embodiment.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
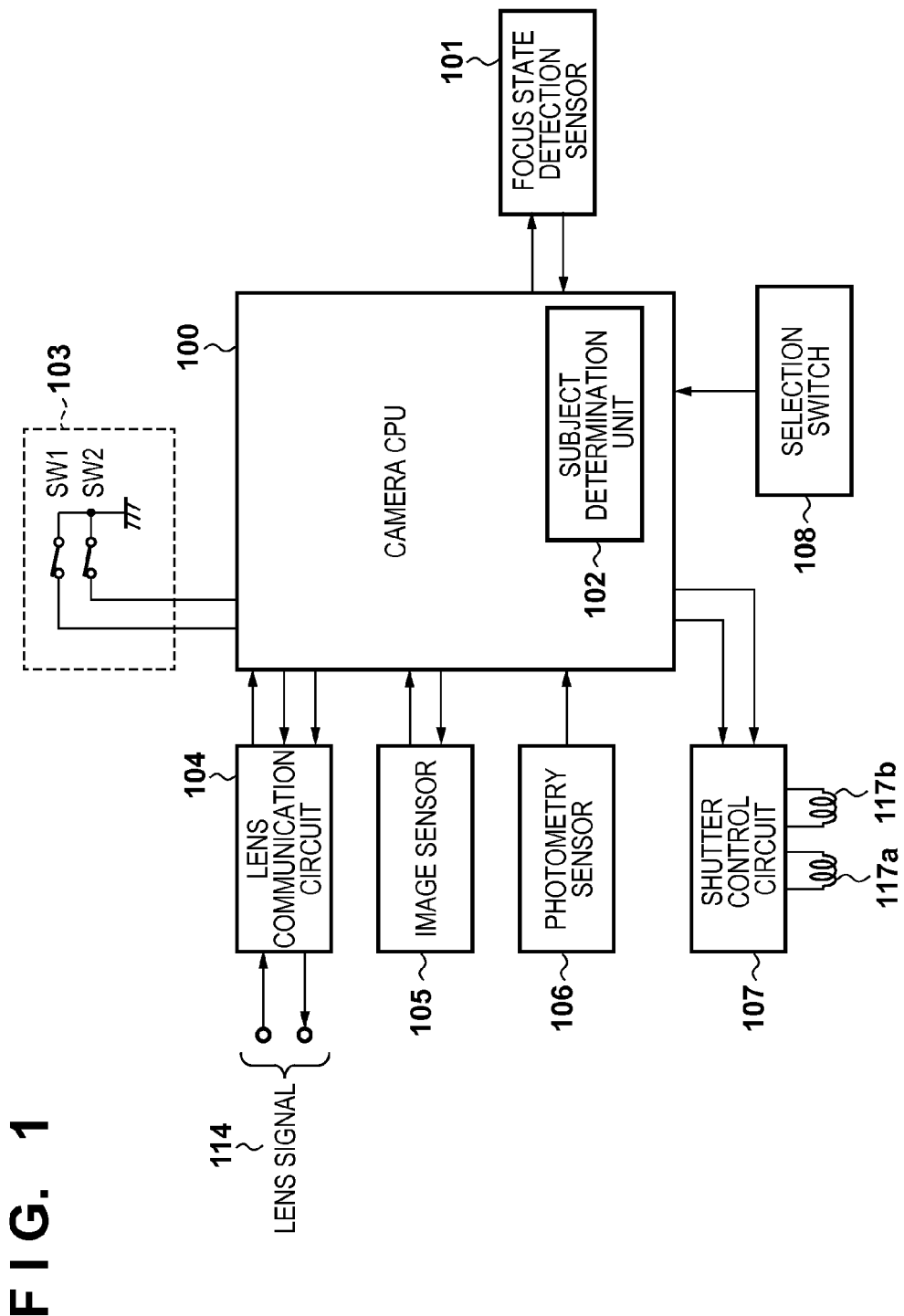
FIG. 1 is a block diagram showing a configuration of a camera according to a first embodiment of the present invention.

FIG. 1 is a block diagram showing a configuration of a camera as an example of an optical apparatus using a focus state detection sensor according to an embodiment of the present invention. Note that in FIG. 1, configurations of the camera that are not configurations for automatic focus detection are omitted.

A switch 103 has two switches SW1 and SW2 that switch on and off with the operation of a release button (not shown). Here, the switch SW1 is switched on with a first stroke (half-press) operation of the release button and the switch SW2 is switched on with a second stroke (full-press) operation of the release button. By switching on the switch SW1, the start of imaging preparation operations including the focus detection operation is instructed, and by switching on the switch SW2, the start of imaging operations is instructed.

A lens communication circuit 104 communicates a lens signal 114 to an imaging lens (not shown) according to control performed by a camera CPU 100, and controls a focus lens, an aperture, and the like, which are included in the imaging lens. According to control performed by the camera CPU 100, a shutter control circuit 107 controls an energization period of electromagnets 117a and 117b included in a shutter mechanism (not shown) and thereby controls the opening and closing of the shutter.

According to the operation of a selection button (not shown), a selection switch 108 selects any focus detection area among multiple focus detection areas arranged on an imaging screen. Note that the positions of the focus detection areas on the imaging screen will be described later.

The camera CPU 100 has a ROM for storing a program, a RAM for storing variables, and an EEPROM (electric erasable programmable read-only memory) for storing parameters, and performs overall control of the operation of the camera by controlling the units based on the program. Also, the camera CPU 100 has a subject determination unit 102 that determines a main subject position based on information from the selection switch 108, and controls a focus state detection sensor 101.

When SW2 is switched on, the camera CPU 100 controls a photometry sensor 106 so as to detect the brightness of the subject, and determines imaging conditions such as the aperture value of the imaging lens (not shown), shutter speed, and the like according to the subject brightness. Then, through the lens communication circuit 104 and the shutter control circuit 107, the camera CPU 100 exposes the image sensor 105 under the determined imaging conditions. Also, by reading out the charge accumulated in the image sensor 105 and applying known image processing, the camera CPU 100 executes a series of imaging operations for generating image data and storing it in a storage medium (not shown).

Arrangement of Optical System Components of Camera

Figure 2:
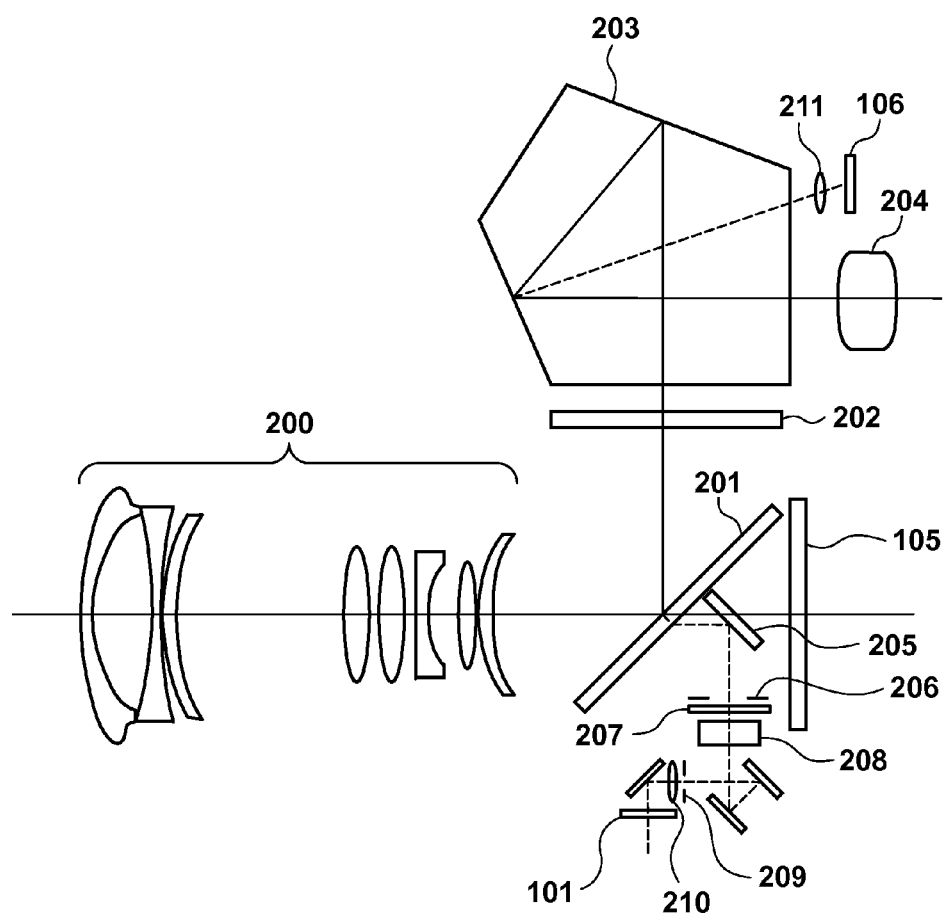
FIG. 2 is a diagram showing an example of optical components and an arrangement thereof of the camera according to the first embodiment.

FIG. 2 is a diagram showing an example of optical components and the arrangement thereof of the camera according to the present embodiment, in which the example of the arrangement of the optical components is shown in a view from a side of the camera. Note that although FIG. 2 shows an imaging lens 200, the lens unit including the imaging lens 200 may be removable, and it need not be configured integrally with the camera.

Most of the luminous flux from the subject that is received via the imaging lens 200 is reflected upward by a quick return mirror 201 and forms an image on a finder screen 202. A photographer observes the subject image formed on the finder screen 202 via a pentaprism 203 and an eyepiece 204. The finder screen 202 is constituted by transmissive liquid crystal and can perform finder display by superimposing various types of information relating to imaging on the formed image. In the present embodiment, the focus detection area selected using the operation of the selection switch 108 is displayed as the imaging information.

A photometry image forming lens 211 and the photometry sensor 106 are provided above the eyepiece 204. The photometry sensor 106 receives the subject image formed on the finder screen 202 through the photometry image forming lens 211, and can thereby measure the subject brightness. Note that the combination and arrangement of the photometry image forming lens 211 and the photometry sensor 106 in FIG. 2 are exemplary, and the configuration and arrangement thereof may be different from those shown in FIG. 2, as long as the subject brightness can be measured.

A portion of the luminous flux received from the imaging lens 200 passes through the quick return mirror 201 and is guided by a rearward sub-mirror 205 to a focus detection optical system located below. The luminous flux that enters the focus detection optical system forms an image on the focus state detection sensor 101 by way of a field-of-view mask 206, an infrared cut filter 207, a field lens 208, an aperture 209, and a secondary image forming lens 210. The focus state (defocus amount) of the imaging lens 200 can be detected based on a phase difference between image signals obtained by performing photoelectric conversion on the formed image using the focus state detection sensor 101.

Note that in the case where the switch SW2 is switched on and an imaging operation is to be performed, the quick return mirror 201 is rotated upward so as to withdraw from the light path along with the sub-mirror 205 and the shutter (not shown) is opened, and thereby the image sensor 105 is exposed to the luminous flux of the subject image received from the imaging lens 200.

Figure 3A:
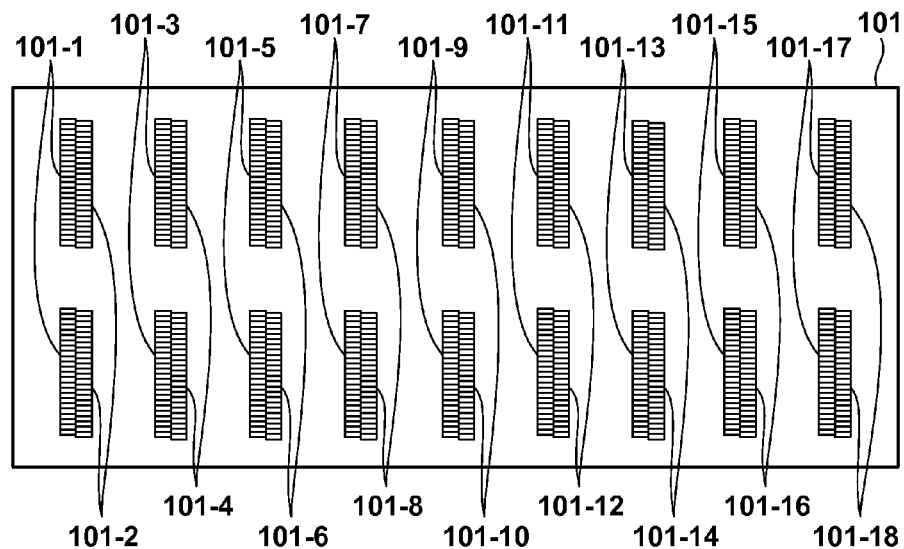
FIGS. 3A and 3B are diagrams showing a relationship between an arrangement of line sensors and focus detection areas according to the first embodiment.

Positional Relationship Between Arrangement of Line Sensors and Focus Detection Areas The positional relationship between multiple line sensors included in the focus state detection sensor 101 and the focus detection areas on a screen will be described next with reference to FIGS. 3A and 3B. FIG. 3A is a diagram showing an example of an arrangement of line sensors in the focus state detection sensor 101. Line sensor pairs 101-1 to 101-18 are each constituted by a pair of sensor arrays, each sensor array has a configuration in which multiple photoelectric converters serving as sensors are arranged linearly, and a signal image can be obtained from the output of the pixels. Also, it is possible to detect the focus state (defocus amount) of the imaging lens based on the phase differences between the signal images obtained from the sensor array pairs. The sensor array pairs are projected in regions that are almost the same in the field of view (screen) by a focus detection optical system such as the secondary image forming lens 210, and that regions form focus detection areas.

Figure 3B:
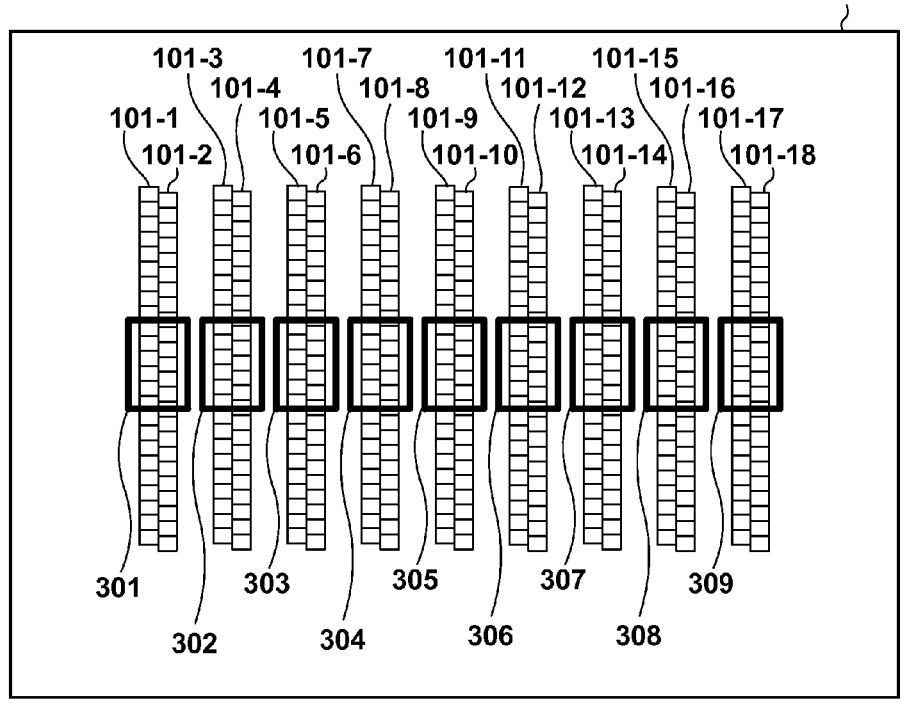

FIG. 3B is a diagram showing an example of the positional relationship between the focus detection areas and the line sensor pairs on the finder screen, which correspond to the focus state detection sensor 101 shown in FIG. 3A. Nine focus detection areas are aligned in a horizontal line on the finder screen 300 (field of view). A focus detection area 301 is formed in a region to which the line sensor pair 101-1 and the line sensor pair 101-2 are projected. Focus detection areas 302 to 309 are similar, and each focus detection area is formed in a region to which two line sensor pairs are projected.

Note that as shown in FIGS. 3A and 3B, in the present embodiment, adjacent sensor arrays are arranged such that they are shifted by a half-pitch. Usually, if the spatial frequency of the subject is high, the detected defocus amount will contain an error due to the relationship between the pixel positions in the sensor array and the phase of the subject's contrast. In order to reduce the error, an average value of two defocus amounts obtained using two sets of sensor array pairs arranged with a half-pixel pitch difference therebetween is used.

Also, FIGS. 3A and 3B show an example in which 18 sets of line sensor pairs shifted in the up-down direction are arranged so as to configure nine focus detection areas, but the arrangement of the line sensor pairs is not limited to this. For example, they may be in a configuration shifted in the left-right direction or a combination of the up-down direction and the left-right direction, and the number of line sensor pairs may be greater than or less than 18.

Figure 4:
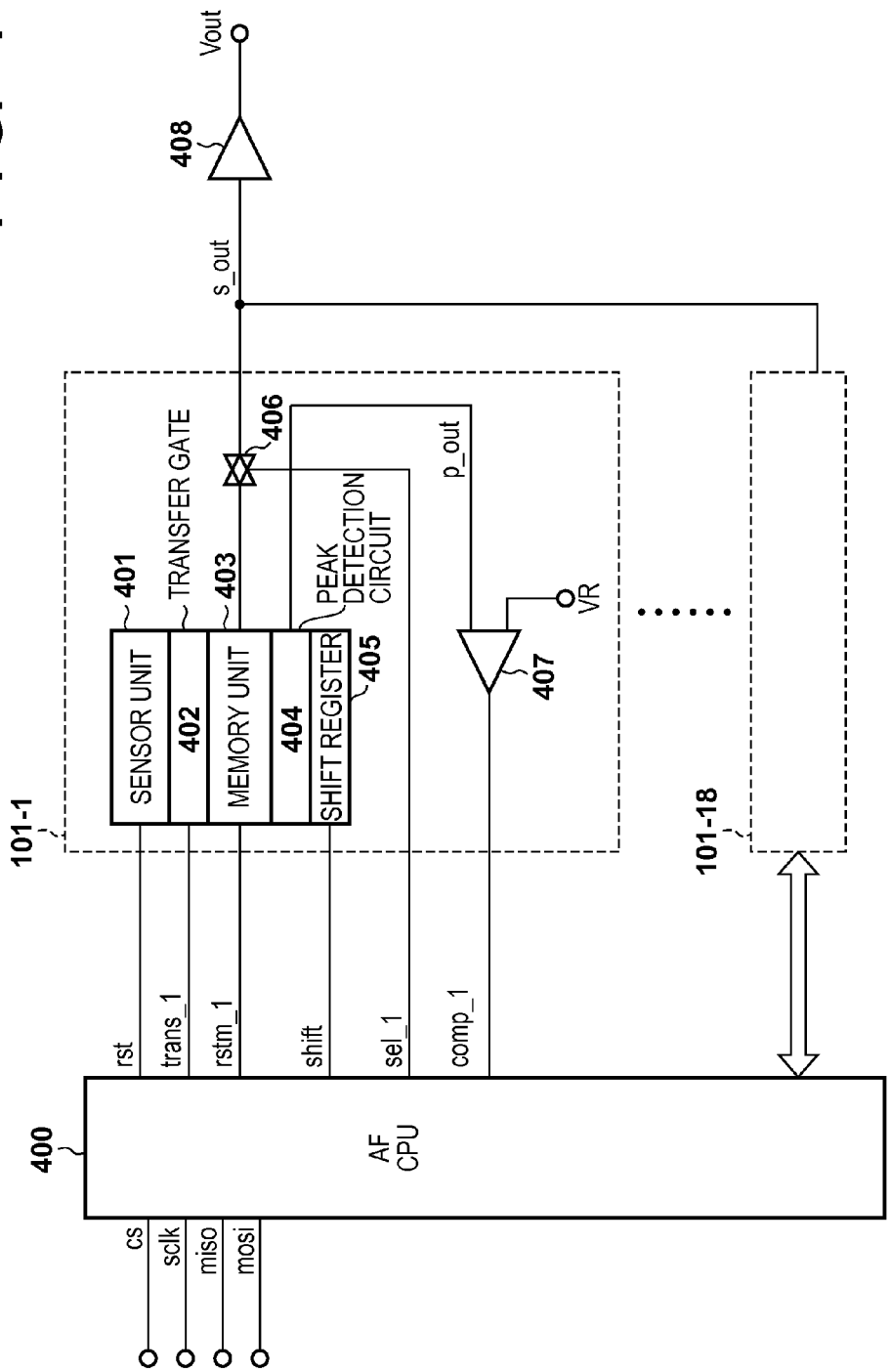
FIG. 4 is a block diagram showing an example of a configuration of a focus state detection sensor according to the first embodiment.

FIG. 4 is a block diagram showing an example of a configuration of the focus state detection sensor 101 according to the present embodiment. FIG. 4 shows details for only the line sensor pair 101-1 among the line sensor pairs 101-1 to 101-18 shown in FIG. 3A, but the line sensor pairs 101-2 to 101-18 have similar configurations as well.

The focus state detection sensor 101 has an automatic focus detection CPU (AFCPU) 400, and the AFCPU 400 controls accumulation operations of the sensor array pairs and an image signal readout operation. In FIG. 4, the sensor unit 401 corresponds to a photoelectric converter group (pixel group) included in a pair of sensor arrays forming the line sensor pair 101-1. When a rst signal is output from the AFCPU 400 (i.e., when the value of the signal is switched to 1), the pixels of the sensor unit 401 are reset. A memory unit 403 integrates the signal charge resulting from the photoelectric conversion performed by the pixels of the sensor unit 401 for each pixel and stores them temporarily, and when a rstm_1 signal is output from the AFCPU 400 (i.e., when the value of the signal is switched to 1), it is reset. A transfer gate 402 is provided between the sensor unit 401 and the memory unit 403, and when a trans_1 signal is output from the AFCPU 400 (i.e., when the value of the signal is switched to 1), the transfer gate opens and the charge is transferred from the sensor unit 401 to the memory unit 403. Also, a peak detection circuit 404 detects the maximum value (p-out) of the signal level of the integrated charge temporarily stored in the memory unit 403 and outputs it to a comparator 407. A shift register 405 selects a pixel whose integrated charge is to be read out from the memory unit 403.

The comparator 407 compares the maximum value (p-out) of the signal level detected by the peak detection circuit 404, and a predetermined voltage VR, and outputs a comp signal indicating the comparison result to the AFCPU 400. The comp signal is a signal that is 1 when p-out>VR and is 0 otherwise. Note that the predetermined voltage VR is a pixel saturation voltage that is set to a value indicating that the accumulation operation is to be ended when p-out>VR.

Upon receiving input of a shift signal, which is a shift pulse, from the AFCPU 400, the shift register 405 selects the output of the memory unit 403 one pixel at a time. Then, while an analog switch 406 is on controlled by a sel_1 signal from the AFCPU 400, the memory output is input to an output amp 408. The output amp 408 amplifies the memory output by an appropriate gain, and outputs a resultant pixel signal from a Vout terminal.

Also, the AFCPU 400 has a register (not shown). The register can be read out from or written in by an external apparatus by serial communication using cs, sclk, miso, and mosi terminals, which are communication terminals included in the AFCPU 400. By setting the values of the register from an external apparatus (e.g., the camera CPU 100), the operation of the focus state detection sensor 101 can be controlled. In the present embodiment, the AFCPU 400 can control two accumulation types of the focus state detection sensor 101.

Accumulation Operations

Next, accumulation operations performed by the focus state detection sensor 101 according to the present embodiment will be described in detail with reference to the flowcharts shown in FIGS. 5 and 6.

First, a control method for performing a first type of accumulation operation will be described in detail with reference to the flowchart in FIG. 5. In step S501, when the register strt (not shown) of the AFCPU 400 is set to 1 by the camera CPU 100, the AFCPU 400 starts the accumulation operation of the focus state detection sensor 101.

In step S502, the AFCPU 400 performs the initial reset operation for the line sensor pair 101-$n$. The register of the AFCPU 400 is cleared to 0, and thereafter the AFCPU 400 outputs a trans_n signal, a rst signal, and a rstm_n signal (i.e., sets the values of the signals to 1) and clears the charge in the sensor unit 401 and the memory unit 403.

In step S503, the AFCPU 400 ends the output of the rst signal and the rstm n signal (i.e. sets the values of the signals to 0), thus completing the resetting of the sensor unit 401 and the memory unit 403 and starting accumulation. Note that the AFCPU 400 outputs the trans_n signal continuously starting at step S502, and therefore the transfer gate 402 is ON, and the signal charge generated by the sensor unit 401 during accumulation is accumulated in the memory unit 403 through the transfer gate 402 and converted into a voltage.

In step S504, the AFCPU 400 uses the value of the comp signal output by the comparator 407 to determine whether or not charge accumulation has been sufficiently performed. If the accumulation of the line sensor pair 101-*n* is sufficient and the charge accumulation is to be ended, namely, if p-out>VR, and comp=1 is output from the comparator 407. If the value of the comp signal is 1 in step S504, the AFCPU 400 executes the accumulation ending processing at step S506 and S507. On the other hand, if comp=0 is output, namely, if p-out≤VR and the accumulation is insufficient, and therefore the processing moves to step S505 and the AFCPU 400 determines the value of register stp_n. The value of the register stp_n is set by communication from an external apparatus (e.g., the camera CPU 100) to the AFCPU 400. Note that with a first type of reading, the register stp_n is set to 1 when the accumulation period reaches a cutoff time in later-described step S708 of FIG. 7, but this will be described in detail later. If the register stp_n is 1, the processing moves to step S506, and if it is not 1, the AFCPU 400 continues the determination processing in step S504 until the comp signal=1.

In step S506, the AFCPU 400 ends the output of the trans_n signal and switches OFF the transfer gate 402. Accordingly, the integrated accumulation charge is stored in the memory unit 403 while the trans_n signal is being output.

In step S507, the AFCPU 400 sets the register tr_n, which indicates an accumulation end flag, to 1, and ends the accumulation operation. By monitoring the register tr_n by means of communication from an external apparatus (e.g., the camera CPU 100), it is possible to know that the accumulation of the line sensor pair 101-*n* has ended.

Next, a control method for performing a second type of accumulation operation will be described in detail with reference to the flowchart in FIG. 6. In step S601, when the register strt (not shown) of the AFCPU 400 is set to 1 by the camera CPU 100, the AFCPU 400 starts the accumulation operation of the focus state detection sensor 101.

In step S602, the AFCPU 400 performs the initial reset operation for the line sensor pair 101-*n*. The register of the AFCPU 400 is cleared to 0, and thereafter the AFCPU 400 outputs a trans_n signal, a rst signal, and a rstm_n signal (i.e., sets the values thereof to 1) and clears the charge in the sensor unit 401 and the memory unit 403.

In step S603, the AFCPU 400 ends the output of the trans_n signal and the rst signal (sets their signal values to 0). Accordingly, the reset of the sensor unit 401 is completed, and the charge generated in the sensor unit 401 is accumulated in the sensor unit 401 accordingly. Here, since the AFCPU 400 has ended the output of the trans=m signal, the transfer gate 402 is OFF, and furthermore, since the AFCPU 400 continues the output of the rstm n signal, the memory unit 403 continues to be reset during charge accumulation in the sensor unit 401 as well.

In step S604, the AFCPU 400 determines the value of the register stp_n. With the second type of accumulation operation, the memory unit 403 is reset also during charge accumulation, and therefore p-out does not become greater than VR, and it is not possible to determine accumulation termination using the comp signal. In view of this, the value of the register stp_n of the AFCPU 400 is set by communication from an external apparatus (e.g., the camera CPU 100) to the AFCPU 400, and thereby termination of the accumulation operation is controlled from the external apparatus. Note that the register stp n is set in later-described step S705 or step S708 in FIG. 7, but this will be described in detail later. Here, if the value of the register stp_n is 1, the AFCPU 400 determines that accumulation has ended and moves to the processing of step S605 and onward. On the other hand, if the value of the register stp_n is 0, the AFCPU 400 continuously executes the determination of the value of the register stp_n in step S604.

In step S605, the AFCPU 400 ends the output of the rstm_n signal and completes the resetting of the memory unit 403. Thereafter, the AFCPU 400 starts output of the trans_n signal so as to switch ON the transfer gate 402 and transfer the accumulation charge integrated in the sensor unit 401 of the line sensor pair 101-*n* to the memory unit 403. During the charge accumulation period, the charge is not transferred from the sensor unit 401 to the memory unit 403, and the memory unit 403 furthermore continues to be reset until directly before when the accumulation ends and the accumulated charge is transferred. For this reason, noise that is generated in the memory unit 403 during the charge accumulation period in the sensor unit 401 is not accumulated in the memory unit 403.

In step S606, the AFCPU 400 ends the output of the trans_n signal and switches OFF the transfer gate 402. Accordingly, the charge transferred in step S605 is stored in the memory unit 403. In step S607, 1 is set in the register tr_n, which indicates an accumulation end flag in the AFCPU 400.

Thus, in the present embodiment, the AFCPU 400 can perform two different types of accumulation operations. Furthermore, by setting the register values of the AFCPU 400 by communication from an external apparatus (e.g., the camera CPU 100), it is possible to switch the accumulation type (first type or second type) for each line sensor pair.

Figure 5:
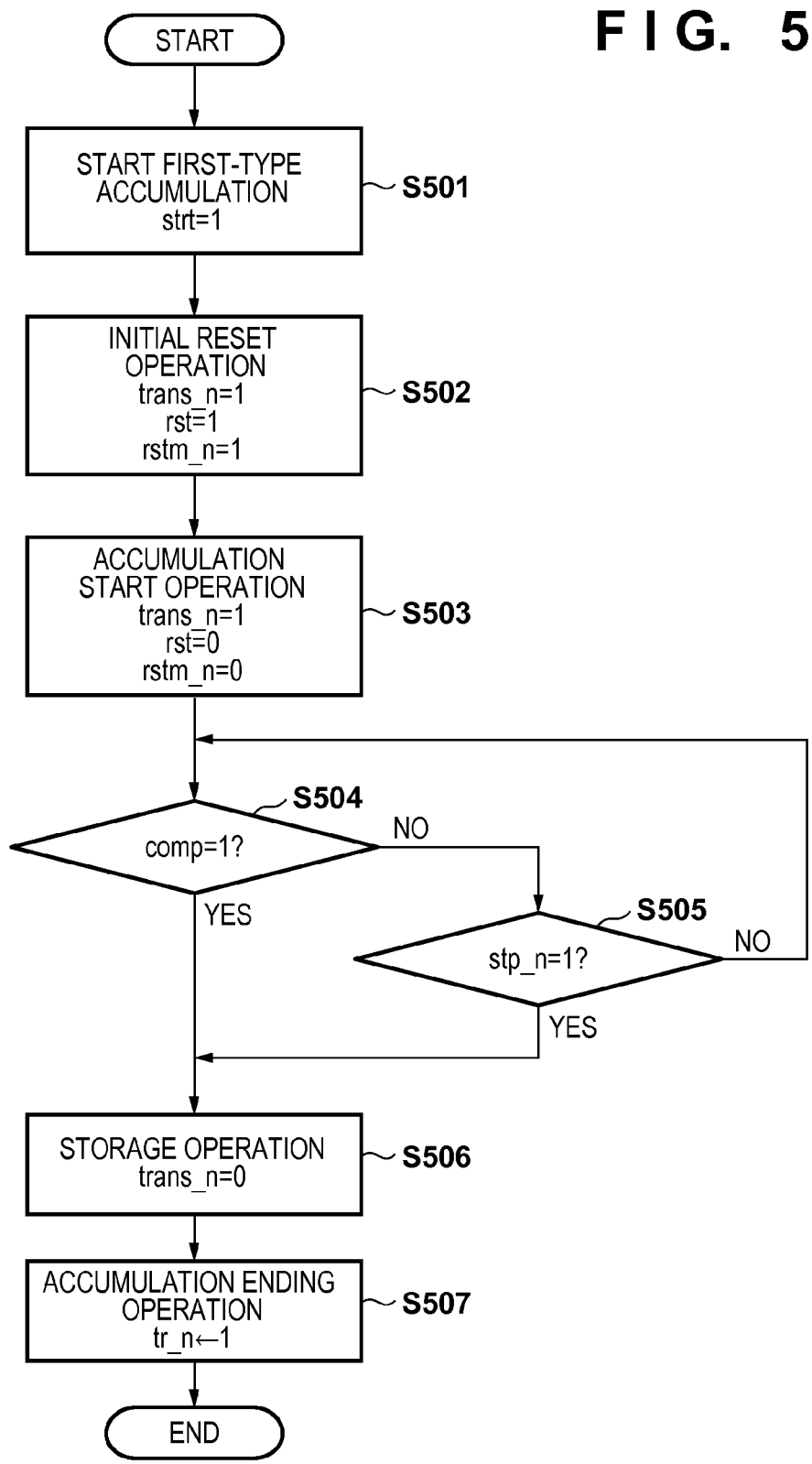
FIG. 5 is a flowchart showing a first type of accumulation operation performed by the focus state detection sensor according to the first embodiment.
Figure 6:
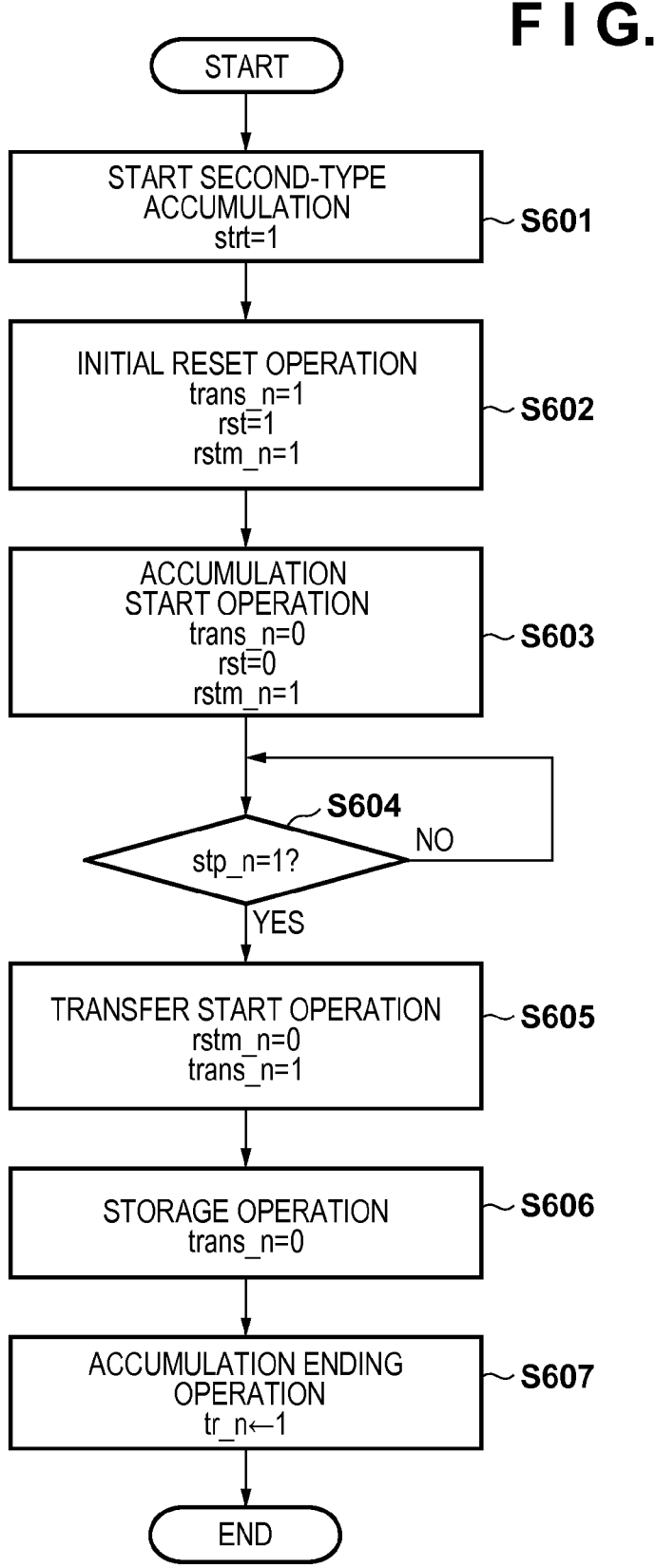
FIG. 6 is a flowchart showing a second type of accumulation operation performed by the focus state detection sensor according to the first embodiment.

With the flowcharts shown in FIGS. 5 and 6, an accumulation operation of any line sensor pair 101-*n* was described, but a similar accumulation operation is performed for the line sensor pairs 101-1 to 101-18. The AFCPU 400 has registers tr_1 to tr_18 and stp_1 to stp_18 for the line sensor pairs 101-1 to 101-18, and also has signal lines for the line sensor pairs 101-1 to 101-18.

Camera Operation

Next, operations of a camera according to the first embodiment, which includes the above-described focus state detection sensor 101, will be described in detail with respect to the flowchart in FIG. 7. This operation is executed by the camera CPU 100 due to the switch SW1 of the camera shown in FIG. 1 being switched ON.

In step S701, the camera CPU 100 determines the main subject position using the subject determination unit 102 in the camera CPU 100. Here, the information of the selection switch 108, or in other words, the selected focus detection area is determined as being the main subject position.

In step S702, the camera CPU 100 determines the accumulation type (first type or second type) for each of the line sensor pairs 101-1 to 101-18 in the focus state detection sensor 101 based on the main subject position determined in step S701. Then, the camera CPU 100 communicates with the AFCPU 400 of the focus state detection sensor 101 so as to set the register value of the AFCPU 400, and thereby sets the accumulation type of each of the line sensor pairs 101-1 to 101-18.

Here, the accumulation type determination method will be described in detail with reference to FIG. 8. FIG. 8 is a correspondence table for main subject positions and the accumulation types of the line sensor pairs 101-n. In FIG. 8, symbols Δ and ▲ indicate the first type, and symbols ○ and ● indicate the second type. The line sensor pairs that form the selected focus detection area, which is the main subject position, are set to the second type, and the line sensor pairs adjacent thereto are set to the first type. Accumulation control for line sensor pairs that do not have the symbols Δ and ▲ or ○ and ● is prohibited.

Returning to FIG. 7, in step S703, the camera CPU 100 communicates with the focus state detection sensor 101 of the AFCPU 400, sets 1 in the register strt of the AFCPU 400, and thereby starts the AF accumulation operation. Accordingly, the accumulation operation described with reference to FIG. 5 or FIG. 6 is started. Also, the camera CPU 100 starts measurement of the accumulation time T using a counter (not shown) that is located inside of the camera CPU 100.

In step S704, based on the value of the register tr_n (n=1 to 18) of the AFCPU 400 of the focus state detection sensor 101, the camera CPU 100 determines whether or not there is a line sensor pair in which the accumulation operation has newly ended. Here, the accumulation end determination is performed only for the line sensor pairs that have been set to the first type in the operation of step S702. If there is a line sensor pair in which accumulation has ended, the processing moves to step S705. On the other hand, if there is no line sensor pair in which accumulation has ended, the processing moves to step S707.

The camera CPU 100 in step S705 stops the accumulation for the line sensor pairs near the line sensor pair in which the accumulation has ended, which was determined in step S704. Here, if the accumulation of a line sensor pair corresponding to Δ, which is set to the first type, ends, the accumulation of a line sensor pair corresponding to ○, which is set to the second type, is stopped. Also, if the accumulation of a line sensor pair corresponding to ▲, which is set to the first type, ends, the accumulation of a line sensor pair corresponding to ●, which is set to the second type, is ended. At this time, the camera CPU 100 communicates with the AFCPU 400 of the focus state detection sensor 101 so as to set 1 in, among the registers stp_n (n=1 to 18) of the AFCPU 400, the register corresponding to the line sensor pair whose accumulation is to be stopped, and thereby stop the AF accumulation operation.

In step S706, if the camera CPU 100 has ended the accumulation for all of the line sensor pairs for which accumulation is allowed, the camera CPU 100 performs a signal readout operation in step S709. On the other hand, if there is a line sensor pair whose accumulation has not ended, the camera CPU 100 returns to step S704.

In step S707, the camera CPU 100 determines the accumulation time T according to a counter. When the accumulation time T≥Tm, the accumulation time of the focus state detection sensor 101 has reached the cutoff time Tm, and therefore the processing moves to step S708. On the other hand, if the accumulation time T<Tm, the procedure returns to step S704, and the accumulation operation is continued.

In step S708, the camera CPU 100 communicates with the AFCPU 400 and sets 1 in the register stp_n (n=1 to 18) of the AFCPU 400 corresponding to, among the line sensor pairs for which accumulation is allowed, the line sensor pair/pairs for which accumulation has not ended, and thereby ends the accumulation of all of the line sensor pairs.

In step S709, the camera CPU 100 communicates with the AFCPU 400 and reads out the pixel signal obtained by the line sensor pairs that forms the focus detection area at the main subject position. The AFCPU 400 outputs a shift signal according to the readout instruction and drives the shift register 405 so as to read out the signal and outputs the signal to the camera CPU 100. The camera CPU 100 sequentially performs A/D conversion on the pixel signals output from the focus state detection sensor 101 and stores them in the RAM (not shown).

In step S710, the camera CPU 100 calculates the defocus amount based on the pixel signals of the line sensor pairs obtained in step S709. Here, the result of calculating the defocus amount obtained based on the pixel signals from the two sets of line sensor pairs constituting the same focus detection area is subjected to averaging or weighted averaging and the like in order to obtain a final result.

In step S711, if the defocus amount calculated in step S710 is within a desired range, for example, within 1/4Fδ (F: lens aperture value, δ: constant (20 μm)), the camera CPU 100 determines that it is in focus. Specifically, if the lens aperture value F=2.0, for example, the camera CPU 100 determines that the present state is in the in-focus state if the defocus amount is 10 μm or less, and moves to the processing of step S713.

On the other hand, if the defocus amount is greater than 1/4Fδ, in step S712, the camera CPU 100 instructs the imaging lens 200 via the lens communication circuit 104 to drive the focus lens in correspondence with the defocus amount calculated in step S710. Then, the camera CPU 100 returns to the processing of step S702 and repeats the above-described operation until the present state is determined as the in-focus state.

In step S713, the camera CPU 100 detects the state of the switch SW2, and if it is ON, the imaging operation is started from step S715. On the other hand, if the switch SW2 is OFF in step S713, the camera CPU 100 detects the state of the switch SW1 in step S714. In step S714, if SW1 remains ON, the camera CPU 100 repeats the processing from step S702, and if SW1 is OFF, the AF operation ends.

In step S715, the camera CPU 100 obtains a subject brightness BV based on the photometry value detected using the photometry sensor 106, and the subject brightness BV is added to the set ISO sensitivity SV so as to obtain an exposure value EV. Then, using a known method such as using a pre-set program line drawing for example, the camera CPU 100 determines the aperture value AV and the shutter speed TV corresponding to the exposure value EV. At the same time as the quick return mirror 201 is withdrawn from the imaging light path, the camera CPU 100 gives an instruction via the lens communication circuit 104 to the imaging lens 200 to set the aperture to an opening corresponding to the determined aperture value AV. Thereafter, the quick return mirror 201 completely withdraws from the imaging light path.

In step S716, the camera CPU 100 controls the shutter speed by controlling the energization period of the electromagnets 117a and 117b via the shutter control circuit 107 and exposes the image sensor 105. In step S717, the camera CPU 100 returns the quick return mirror 201 to the position in the imaging light path and ends the imaging operation. Note that processing of the image signals accumulated in the image sensor 105 (so-called development processing or processing for recording on a recording medium) may be performed using known processing, and therefore the description thereof will not be included here.

Figure 9A:
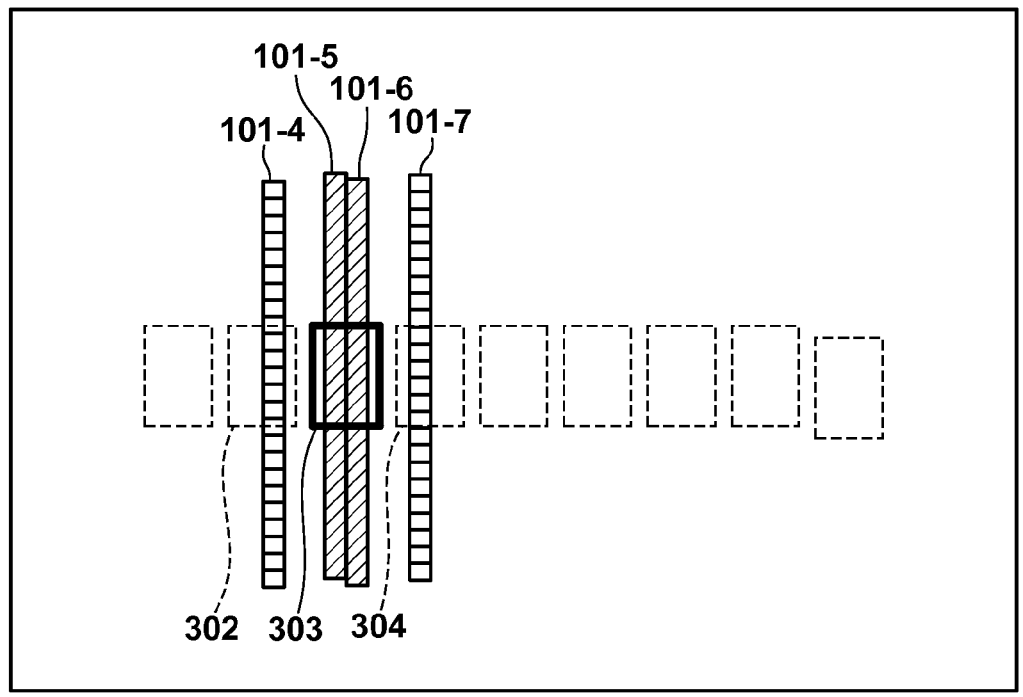
FIGS. 9A and 9B are diagrams showing an example of setting accumulation types of line sensor pairs according to the first embodiment.

Here, a specific example will be described with reference to FIGS. 9A and 9B. FIG. 9A shows setting of accumulation types for line sensor pairs in the case where focus detection area 303 is selected by the selection switch 108. Based on the correspondence table in FIG. 8, if the focus detection area 303 is selected, the line sensor pairs 101-5 and 101-6 indicated by the diagonal lines are set to the second type. Note that line sensor pairs that are set to the second type cannot perform signal monitoring during accumulation. In view of this, the line sensor pairs 101-4 and 101-7 that constitute portions of the adjacent focus detection areas 302 and 304 are set to the first type for accumulation monitoring. The line sensor pairs set to the first type can perform signal monitoring during accumulation, and therefore accumulation control that is appropriate according to the subject brightness can be performed in the focus state detection sensor 101. In view of this, in the first embodiment, the accumulation of the line sensor pair 101-5 is stopped at the timing when the accumulation of the line sensor pair 101-4 is stopped, and the accumulation of the line sensor pair 101-6 is stopped at the timing when the accumulation of the line sensor pair 101-7 is stopped.

Figure 9B:
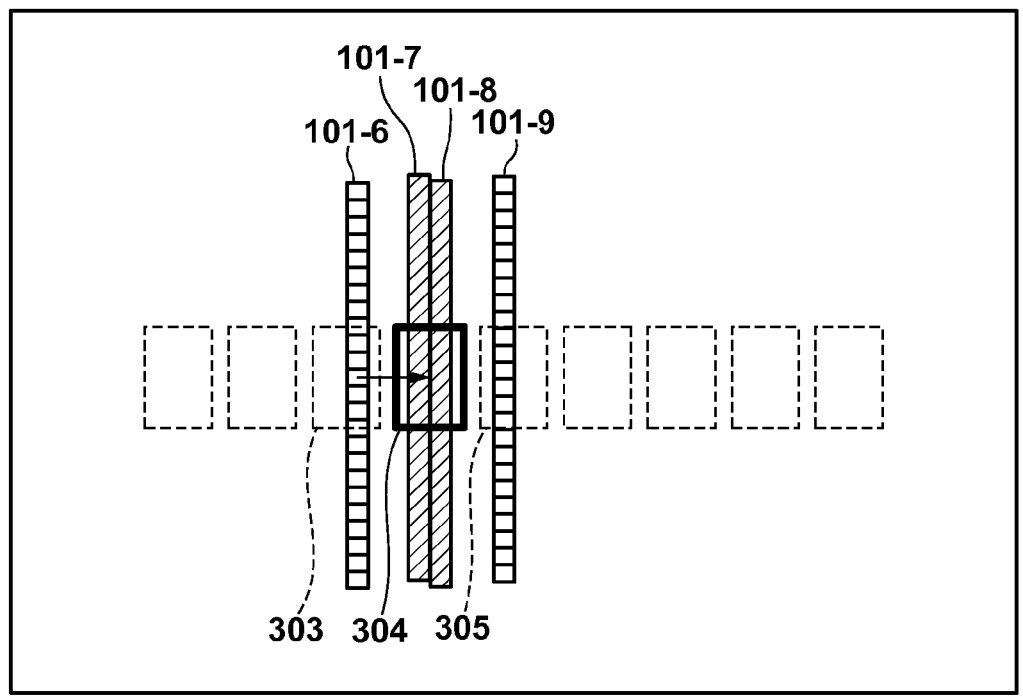

FIG. 9B shows the setting of the accumulation types of the line sensor pairs in the case where the selected focus detection area is moved from the focus detection area 303 to the focus detection area 304. Based on the correspondence table in FIG. 8, if the focus detection area 304 is selected, the line sensor pairs 101-7 and 101-8 indicated by the diagonal lines are set to the second type. Furthermore, the line sensor pairs 101-6 and 101-9 that constitute portions of the adjacent focus detection areas 303 and 305 are set to the first type for accumulation monitoring. The accumulation of the line sensor pair 101-7 is stopped at the timing when the accumulation of the line sensor pair 101-6 is stopped, and the accumulation of the line sensor pair 101-8 is stopped at the timing when the accumulation of the line sensor pair 101-9 is stopped.

In FIG. 9A, the accumulation operation of the line sensor pair 101-7 was of the first type, which is for monitoring, but in FIG. 9B, it is changed to the second type, which is for focus detection. On the other hand, in FIG. 9A, the accumulation operation of the line sensor pair 101-6 was of the second type, which is for focus state detection, but in FIG. 9B, it is changed to the first type, which is for monitoring. Thus, the accumulation type of the line sensor pair changes according to the selected focus detection area.

As described above, according to the first embodiment, since the accumulated charge can be monitored by a first-type line sensor pair during the charge accumulation period, the charge accumulation period can be appropriately controlled and a high-quality image signal can be obtained from a second-type line sensor pair. In particular, it is possible to suppress a decrease in the SN ratio of the image signal in the case where the subject brightness is low. Also, since it is not necessary to add a monitoring-dedicated line sensor pair, it is easier to design the focus state detection sensor.

Note that in the first embodiment, the camera CPU 100 controls the timing at which the accumulation of the line sensor pair set to the second type ends, but the AFCPU 400 in the focus state detection sensor 101 may perform this control.

Also, in the first embodiment, it was described that the comparator 407 compares the maximum value (p-out) of the signal level detected by the peak detection circuit 404 and the predetermined voltage VR, and if p-out>VR, 1 is output at the comp signal, and otherwise, 0 is output. However, the present invention is not limited thereto, and for example, it is possible to compare a difference (contrast) between a maximum value and a minimum value in the signal level accumulated in the memory unit 403 with a pre-determined value, and if the difference exceeds the pre-determined value, 1 is output as the comp signal, and otherwise, 0 is output.

Second Embodiment

Next, a second embodiment of the present invention will be described. The second embodiment will describe an example in which face information is used for main subject determination. Note that since the present embodiment is similar to the first embodiment in that the accumulation type is switched between a first type and a second type and may be similar to the first embodiment regarding the configuration of the focus detection optical system as well, redundant description thereof will be omitted.

Figure 10:
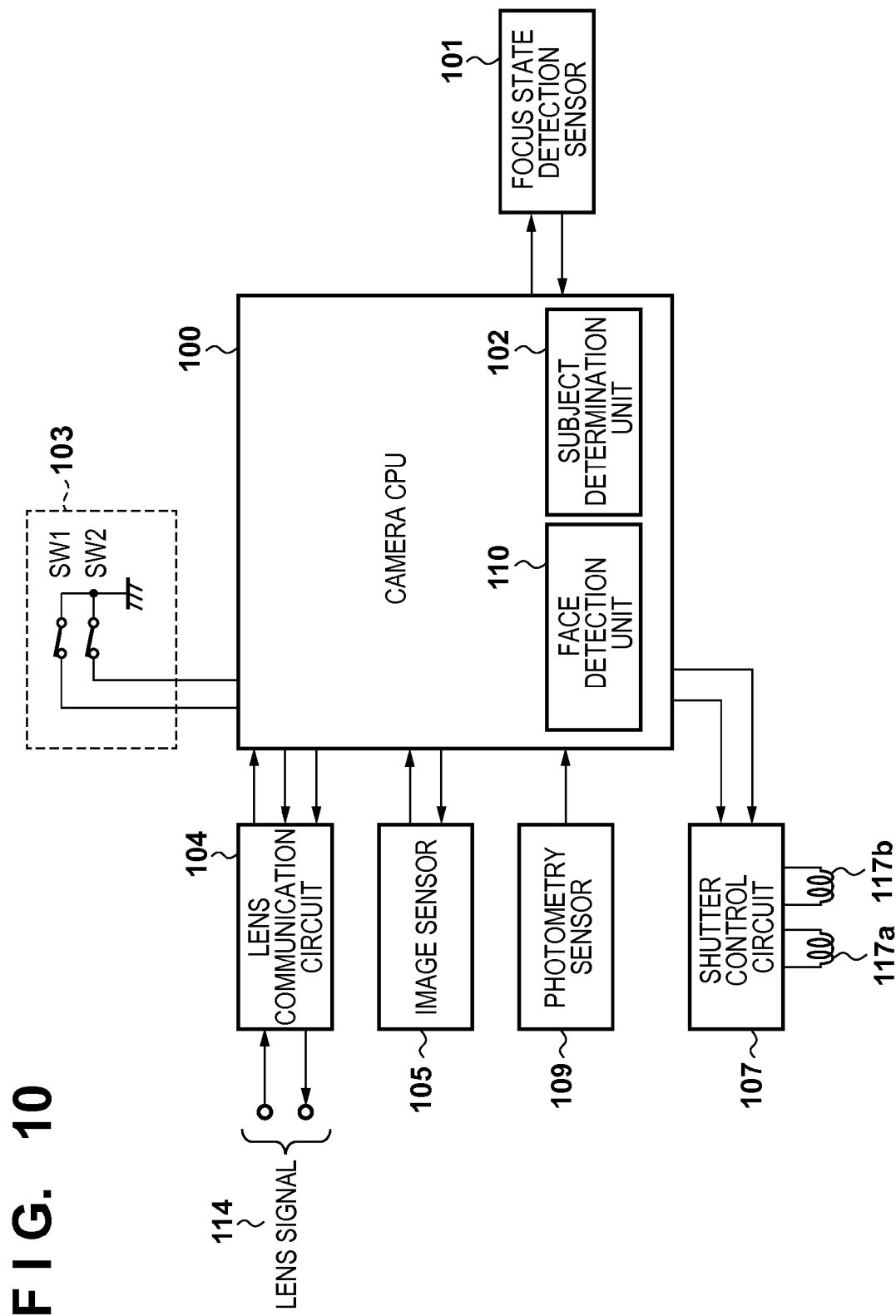
FIG. 10 is a block diagram showing a configuration of a camera according to a second embodiment.

FIG. 10 is a block diagram showing an example of a configuration of a camera serving as an example of an optical apparatus in which a focus state detection sensor according to the second embodiment is used. Note that the configuration of the camera shown in FIG. 10 other than the photometry sensor 109 and the face detection unit 110 is the same as that shown in FIG. 1, and therefore the same reference numerals will be used, and the description thereof will not be repeated here.

The photometry sensor 109 is a multipixel area sensor for capturing a subject image for photometry and subject recognition, and R (red), G (green), and B (blue) primary color filters are provided in the pixel portion. Accordingly, an RGB signal of the subject image can be output. By controlling the photometry sensor 109, the camera CPU 100 detects the brightness of the subject and determines the aperture value of the imaging lens (not shown) and shutter speed. Furthermore, by processing the brightness distribution information and color information of the subject image using the face detection unit 110 in the CPU 100 based on the image obtained by the photometry sensor 109, the main subject position in the image is detected based on characteristic information of a person stored in advance.

Camera Operation

Figure 11:
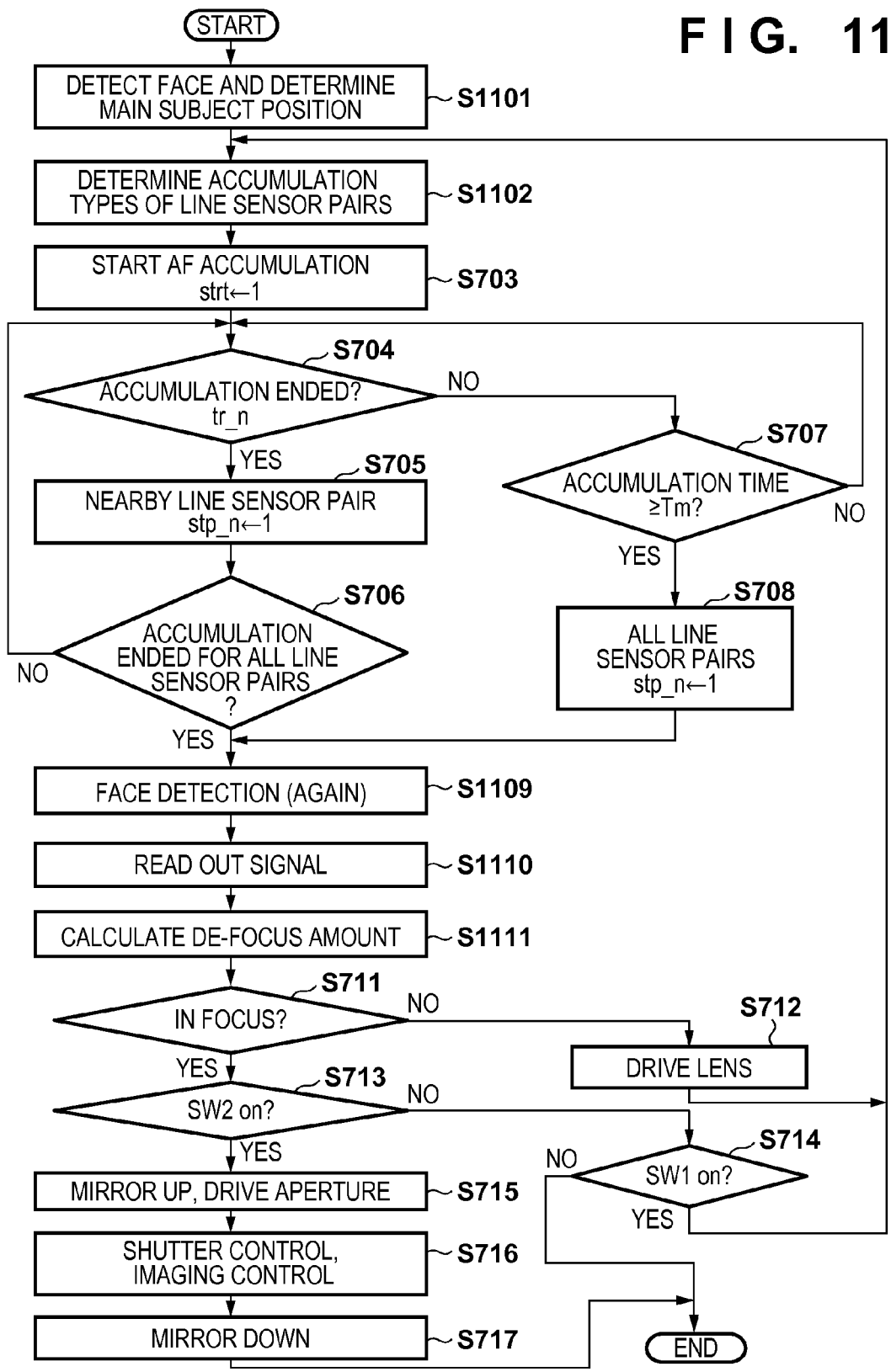
FIG. 11 is a flowchart showing an operation of a camera that includes the focus state detection sensor according to the second embodiment.

An example of an operation according to the second embodiment of the camera shown in FIG. 10 will be described next in detail with reference to the flowchart shown in FIG. 11. This operation is executed by the camera CPU 100 due to the switch SW1 of the camera shown in FIG. 10 being switched ON. The processing shown in FIG. 11 differs from the above-described processing shown in FIG. 7 in that the subject determination unit 102 determines the main subject position according to the detection result of the face detection unit 110. Note that processes that are similar to the processes described above in the first embodiment with reference to FIG. 7 are denoted by the same step numbers, and the description thereof is omitted as appropriate.

First, in step S1101, a face on the screen is detected by the face detection unit 110 in the camera CPU 100, and the main subject position is furthermore determined by the subject determination unit 102. Here, a person's face is detected based on the luminance distribution information and color information of the subject in the image obtained by the photometry sensor 109, and the face position is set as the main subject position.

In step S1102, the camera CPU 100 determines the accumulation type (first type or second type) for each of the line sensor pairs 101-1 to 101-18 in the focus state detection sensor 101, based on the information regarding the main subject position determined in step S1101. Then, the camera CPU 100 communicates with the AFCPU 400 of the focus state detection sensor 101 so as to set the register value of the AFCPU 400, and thereby sets the accumulation types of the line sensor pairs 101-1 to 101-18.

Here, the accumulation type determination method will be described in detail with reference to FIG. 12. FIG. 12 is a correspondence table for the main subject position and the accumulation types of the line sensor pairs 101-n. In FIG. 12, symbols △ and ▲ indicate the first type, and symbols ○ and ● indicate the second type. In FIG. 12, the line sensor pair corresponding to the selected focus detection area is set to the second type. Furthermore, among the two line sensor pairs that form an adjacent focus detection area, one of the line sensor pairs is set to the first type and the other is set to the second type. Accumulation control for line sensor pairs that are not indicated by the symbols Δ and ▲ or ○ and ● is prohibited. By performing setting in this manner, even in the case of moving from the focus detection area position in which the main subject has been selected to an adjacent focus detection area, an image signal can be acquired by the line sensor pair set to the second type.

After the accumulation types are determined in step S1102, in steps S703 to S708, accumulation processing is performed in a manner similar to the accumulation processing described with reference to FIG. 7.

When the accumulation of all of the line sensor pairs for which accumulation is allowed ends, in step S1109, the camera CPU 100 determines the main subject position once again using the face detection unit 110. With this operation, it is possible to deal with cases where the subject is moving, or the like, in which the main subject position moves from the focus detection area position determined in step S1101 to a nearby focus detection area.

In step S1110, the camera CPU 100 communicates with the AFCPU 400 so as to read out the pixel signals obtained by, from among the line sensor pairs that form the focus detection area corresponding to the main subject position detected in step S1109, the line sensor pair set to the second type. Even if the main subject position detected in step S1109 is different from the main subject position detected in step S1101, or in other words, even in the case of where the main subject position detected in step S1101 is moved to an adjacent focus detection area, one line sensor pair exists that is set to the second type. The AFCPU 400 outputs a shift signal according to the readout instruction, drives the shift register 405 so as to read out the signal, and outputs the signal to the camera CPU 100. The camera CPU 100 sequentially performs A/D conversion on the pixel signals output from the focus state detection sensor 101 and stores them in the RAM (not shown).

In step S1111, the camera CPU 100 calculates the defocus amount based on the pixel signal from the line sensor pair/pairs obtained in step S1110. Here, if two line sensor pairs were read out in step S1110, the calculation result of the obtained defocus amount is subjected to averaging, weighted averaging, or the like in order to obtain the final result.

Figure 7:
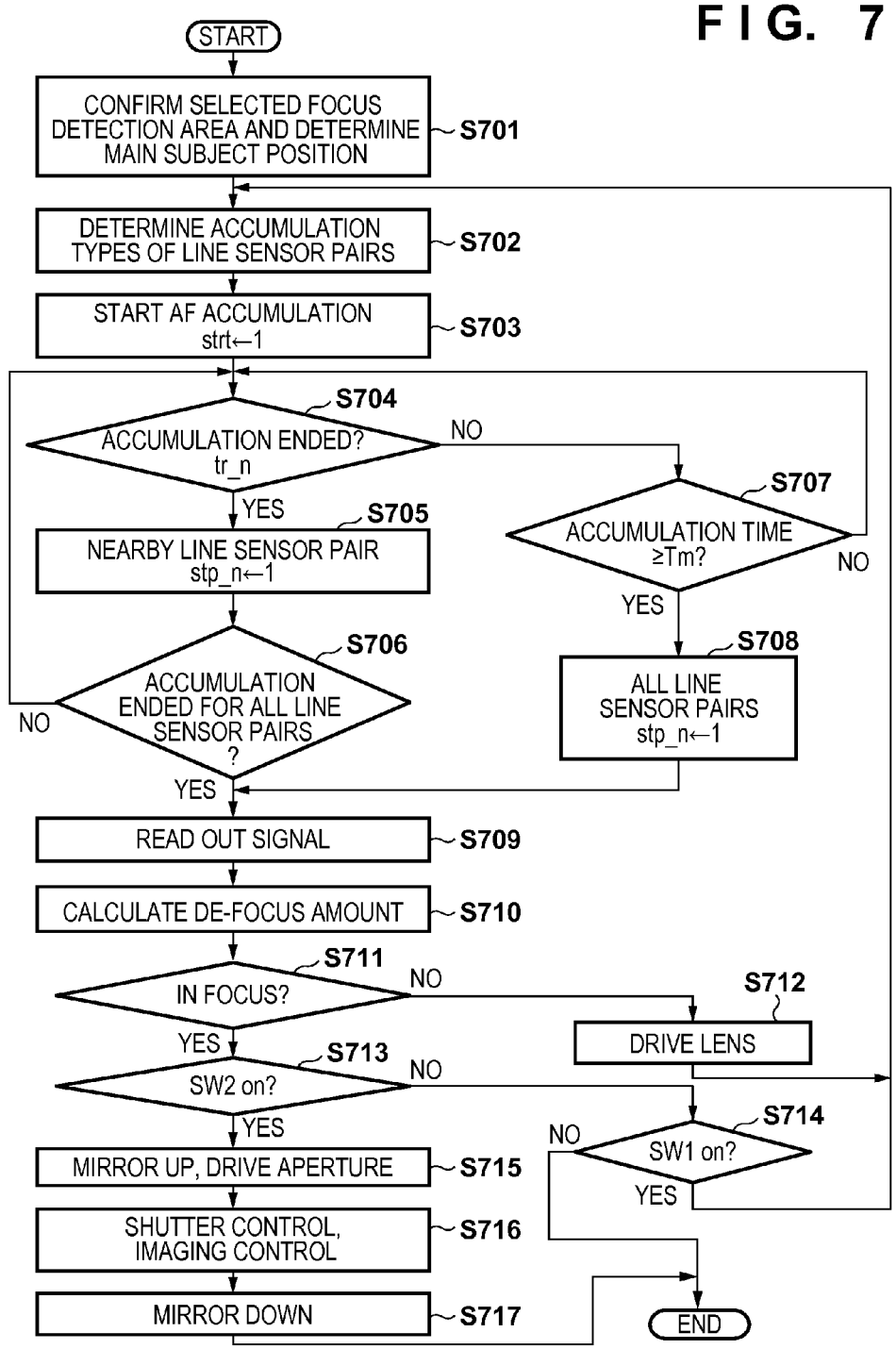
FIG. 7 is a flowchart showing an operation of a camera that includes the focus state detection sensor according to the first embodiment.

Since the operations of steps S711 to S717 are similar to the processing described in the first embodiment with reference to FIG. 7, the description thereof will not be repeated here.

Figure 13A:
FIGS. 13A and 13B are diagrams showing an example of setting accumulation types of line sensor pairs according to the second embodiment.
Figure 13B:
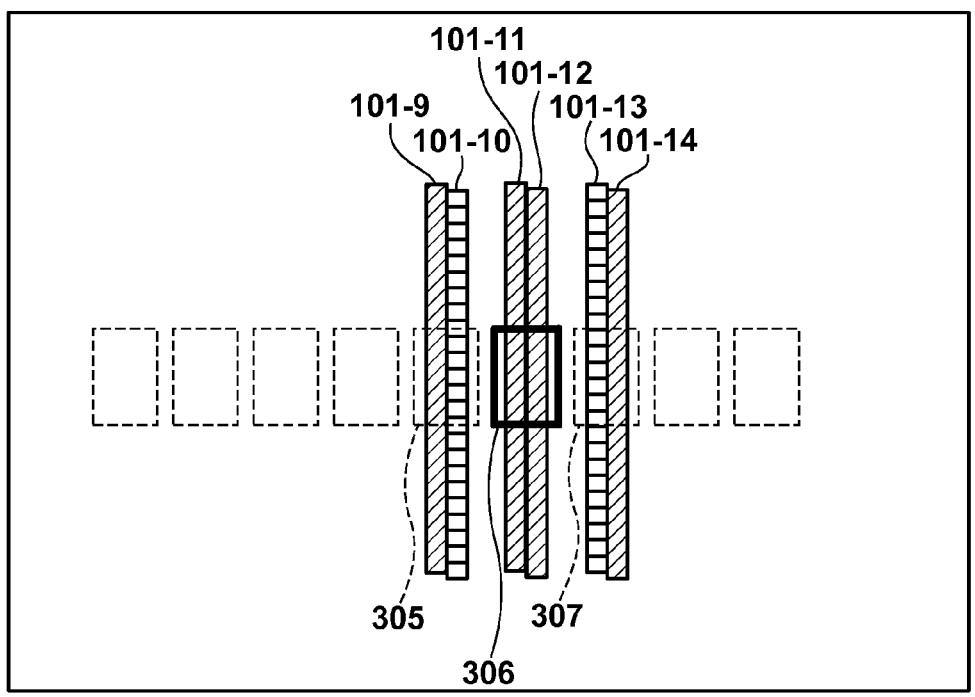

Here, setting of accumulation types of line sensors in the case where the face detection position is the focus detection area 306 shown in FIG. 3B will be described with reference to FIGS. 13A and 13B. FIG. 13A shows an example of an imaging screen. There is a face in the focus detection area 306, which is the 6th focus detection area from the left among the focus detection areas 301 to 309. The positional relationship between the line sensor pairs and the focus detection areas in this case is shown in FIG. 13B. Based on the correspondence table in FIG. 12, the line sensor pairs 101-9, 101-11, 101-12, and 101-14, which are indicated by diagonal lines, are set to the second type. Note that line sensor pairs that are set to the second type cannot perform signal monitoring during accumulation. In view of this, for accumulation monitoring, the line sensor pair 101-10 located between the line sensor pairs 101-9 and 101-11, and the line sensor pair 101-13 located between the line sensor pairs 101-12 and 101-14 are set to the first type. The line sensor pairs set to the first type can perform signal monitoring during accumulation, and therefore accumulation control that is appropriate according to the subject brightness can be performed in the focus state detection sensor 101. The accumulation of the adjacent line sensor pairs 101-9 and 101-11 is ended at the timing when the accumulation of the line sensor pair 101-10 ends. Also, the accumulation of the adjacent line sensor pairs 101-12 and 101-14 is ended at the timing when the line sensor pair 101-13 ends.

As described above, even in the case where the focus detection area is moved from the focus detection area in which the main subject position was first detected to another focus detection area, it is possible to detect the image signal.

Note that in the second embodiment, a person's face is used for determination of the main subject, but a feature other than a person's face may be used.

Also, in the above-described first and second embodiments, the focus state detection sensor 101 was described as being configured by multiple line sensor pairs, but the present invention is not limited to line sensors. For example, a configuration may be used in which a photoelectric converter groups obtained by arranging multiple photoelectric converters in two dimensions are arranged at positions corresponding to focus detection areas.

The above-described embodiments described embodiments for a still camera, but the present invention is not limited thereto and can be applied to a variety of image capturing apparatuses that perform focus adjustment. For example, the present invention may be applied to a camcorder (movie camera) that captures a moving image, various types of examination cameras, a monitoring camera, an endoscopic camera, a robot camera, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-066806, filed on Mar. 27, 2014 which is hereby incorporated by reference herein in its entirety.

What is claimed is:

1. A focus detection apparatus comprising:
 a plurality of sensor groups, each comprising a plurality of sensors, wherein each sensor includes a photoelectric converter configured to generate charge according to incident light and a storage portion configured to store charge transferred from the photoelectric converter, and each sensor group corresponds to each of a plurality of focus detection areas;
 a selection unit configured to select one of the plurality of focus detection areas;
 a control unit configured to control charge accumulation of the sensor group according to one of a first accumulation method in which charge generated by the photoelectric converter is accumulated in the photoelectric converter, and a second accumulation method in which charge generated by the photoelectric converter is transferred to and accumulated in the storage portion; and
 a monitor unit configured to, for each sensor group controlled according to the second accumulation method, monitor a signal level of the charge stored in the storage portion,
 wherein the control unit controls according to the first accumulation method a sensor group corresponding to the focus detection area selected by the selection unit, and controls according to the second accumulation method a sensor group adjacent to the sensor group controlled according to the first accumulation method.

2. The focus detection apparatus according to claim 1, wherein based on the signal level of a sensor group controlled according to the second accumulation method, which is monitored by the monitor unit, the control unit controls an end of charge accumulation in that sensor group and the adjacent sensor group controlled using the first accumulation method.

3. The focus detection apparatus according to claim 1, wherein while charge is being accumulated in the photoelectric converters controlled according to the first accumulation method, the control unit resets the corresponding storage portions.

4. The focus detection apparatus according to claim 1, wherein the selection unit receives an instruction to select one of the plurality of focus detection areas.

5. The focus detection apparatus according to claim 1, further comprising a subject determination unit configured to determine a subject based on a distribution of brightness and information regarding color, obtained from a photometry unit,
wherein the selection unit selects a focus detection area including the subject determined by the subject determination unit.

6. The focus detection apparatus according to claim 5, wherein the focus detection areas each correspond to a plurality of the sensor groups, and
the control unit controls according to the first accumulation method the sensor group corresponding to a focus detection area in which the subject is included.

7. The focus detection apparatus according to claim 6, wherein the control unit controls according to the first accumulation method a portion of the plurality of the sensor groups corresponding to a focus detection area adjacent to the focus detection area in which the subject is included, and the control unit controls according to the second accumulation method the other sensor groups corresponding to the adjacent focus detection area.

8. The focus detection apparatus according to claim 1, wherein the control unit prohibits accumulation of charge in the sensor groups that are set to neither the first accumulation method nor the second accumulation method.

9. The focus detection apparatus according to claim 1, further comprising a focus detection unit configured to detect a focus state based on image signals corresponding to the charge obtained from the sensor group corresponding to the focus detection area selected by the selection unit.

10. The focus detection apparatus according to claim 9, wherein the focus detection unit detects the focus state based on a phase difference between the image signals.

11. The focus detection apparatus according to claim 1, wherein, if the signal level of a sensor group controlled according to the second accumulation method, which is monitored by the monitor unit, exceeds a pre-determined value, or if a value indicating contrast in the signal exceeds a predetermined value, the control unit ends charge accumulation.

12. An image capturing apparatus comprising:
an image capturing unit; and
the focus detection apparatus according to claim 1.

13. A method for controlling a focus detection apparatus having a plurality of sensor groups, each comprising a plurality of sensors, wherein each sensor includes a photoelectric converter configured to generate charge according to incident light and a storage portion configured to store charge transferred from the photoelectric converter, and each sensor group corresponding to each of a plurality of focus detection areas, the method comprising:
a selection step of selecting one of the plurality of focus detection areas;
a control step of controlling, according to a first accumulation method in which charge generated by the photoelectric converter is accumulated in the photoelectric converter, a sensor group corresponding to the focus detection area selected in the selection step, and controlling, according to a second accumulation method in which charge generated by the photoelectric converter is transferred to and accumulated in the storage portion, a sensor group adjacent to the sensor group controlled according to the first accumulation method; and
a monitor step of, for each sensor group controlled according to the second accumulation method, monitoring a signal level of the charge stored in the storage portion.

* * * * *